Dec. 13, 1966 R. R. MILLER 3,290,938
PNEUMATIC DISPLACEMENT LEVEL INDICATOR FOR STORAGE BIN
Filed May 13, 1965 2 Sheets-Sheet 1
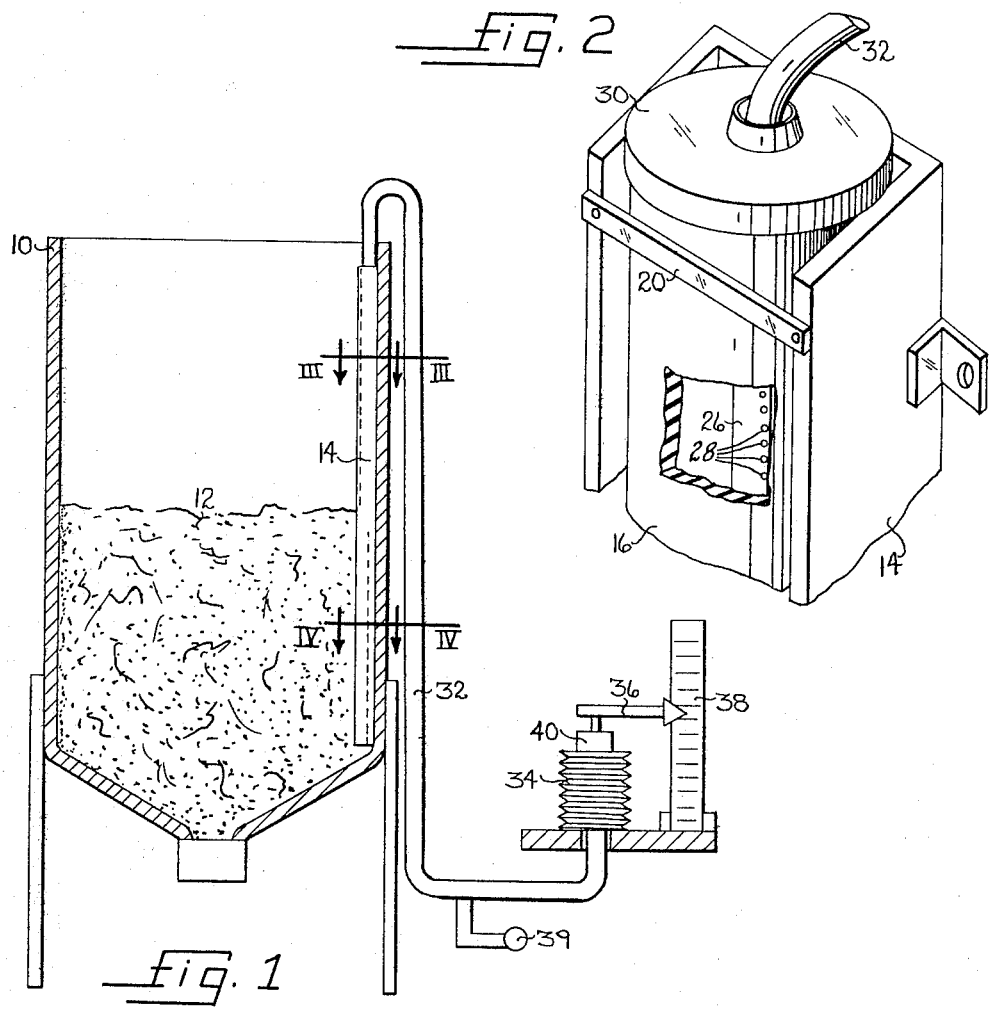
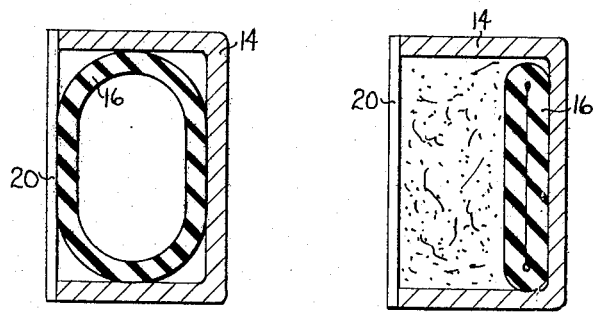
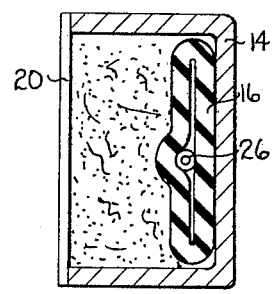
INVENTOR.
RALPH R. MILLER

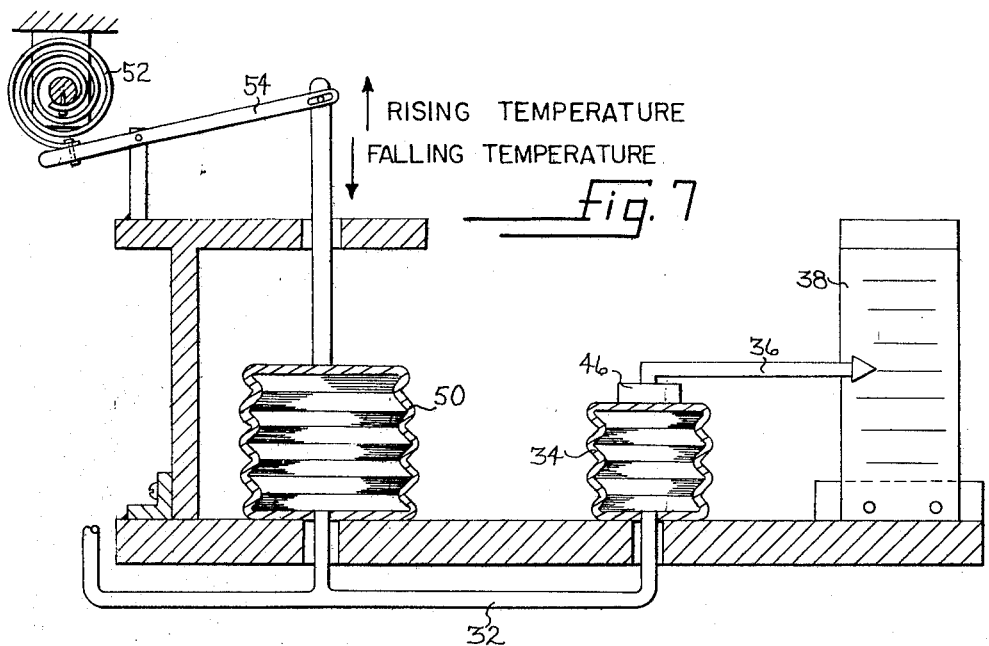
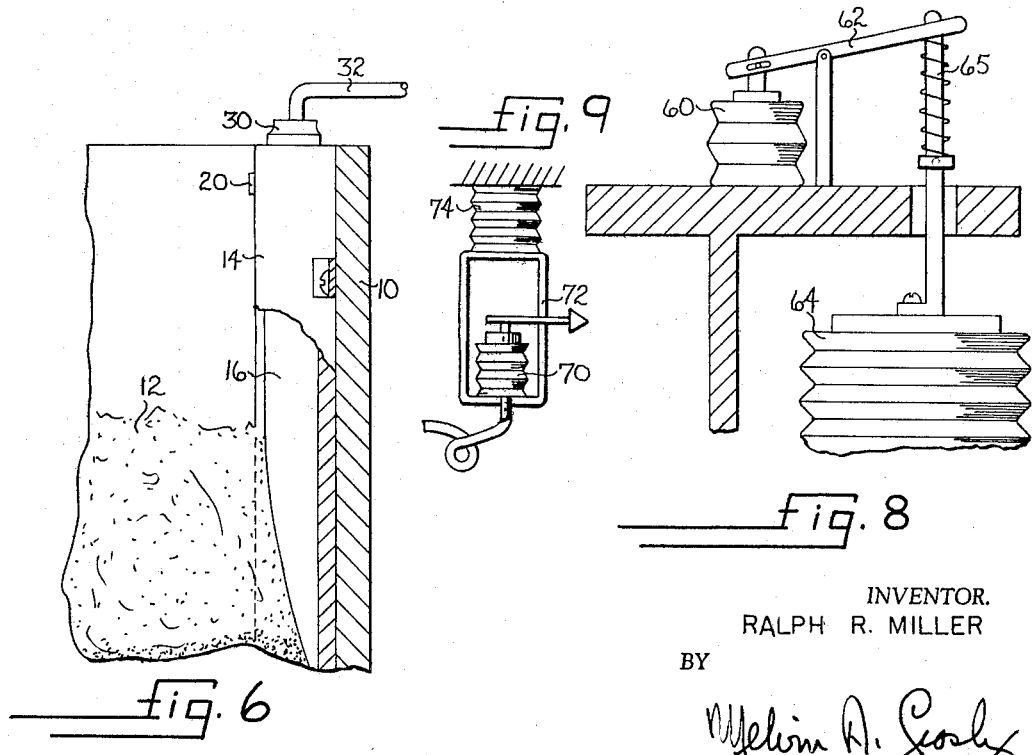

United States Patent Office 3,290,938
Patented Dec. 13, 1966

3,290,938
PNEUMATIC DISPLACEMENT LEVEL INDICATOR FOR STORAGE BIN
Ralph R. Miller, 6730 Lakeside Drive, Charlotte, N.C.
Filed May 13, 1965, Ser. No. 455,387
10 Claims. (Cl. 73—290)

This invention relates to a measuring device, and is particularly concerned with a level indicator for a storage bin or the like, although the principle of the invention could readily be employed in place of weighing scales for batch mixing, etc. More particularly still, the present invention relates to a level indicator for a storage bin having flowable materials therein such as cement, lime, grain, sand, crushed stone or the like, or mixture therein.

The measurement of liquid levels in containers has always been relatively simple, but with flowable granular or solid materials it is often difficult with any degree of certainty to determine the level of the material in a storage compartment. It is in connection with this sort of measurement that the present invention is particularly concerned.

Further, the accurate proportioning of dry materials, such as light weight aggregates in batch mixing has always been difficult without weighing each portion of the mixture.

I have found that such materials have a sort of fluid or hydraulic action and can only maintain an angle of a predetermined amount at any point across the upper surface and will, furthermore, exert a side pressure below the upper surface. I employ these characteristics of flowable materials in my invention.

Several level indicators are available on the market that give only one specific level, i.e. high level, low level or middle level, and it would take a series of such indicators to get most levels. There is no indicator of this nature, known to me, that reads out in continuous levels. Most commonly known types that give readings of specific levels incorporate an electric light as the level indicator when this level has been reached. This necessitates the use of electric wiring and connections which tend to lead to faulty operation, and also necessitates the use of electric power or storage batteries. The present invention gives the user the advantage of knowing any level that his bin might be at by the glance at the pointer.

With the foregoing in mind, it is a primary object of the present invention to construct an indicator device for indicating the level of flowable granular or powdered solid materials in a storage bin or container.

Another object of this invention is the provision of a level indicator of the nature referred to which can readily be placed in substantially any type of container or storage bin.

A still further object of this invention is the provision of a device of the nature referred to which is inexpensive and relatively accurate.

These and other objects and advantages of this invention will become more apparent upon reference to the following specification taken in connection with the accompanying drawings, in which:

FIGURE 1 is a somewhat diagrammatic vertical sectional view through a container for flowable granulated or divided solid materials having a level detector according to the present invention mounted therein and connected with an indicator external of the container;

FIGURE 2 is a fragmentary perspective view partly in section showing details of the detector device;

FIGURE 3 is a cross sectional view indicated by line III—III on FIGURE 1;

FIGURE 4 is a sectional view indicated by line IV—IV on FIGURE 1;

FIGURE 5 is a sectional view like FIGURE 4 but showing a modification;

FIGURE 6 is a sectional view drawn at enlarged scale showing more in detail the manner in which the detector tube is collapsed by the flowable material;

FIGURE 7 is a view showing a modification of the indicator divided including a temperature compensation;

FIGURE 8 is a view showing another temperature compensation; and

FIGURE 9 shows another temperature compensation arrangement.

In the drawings, in FIGURE 1 a container 10 contains flowable material 12 which may consist of Portland cement, lime, grain, sand or crushed stone or a similar substance and which substance may be completely dry or may contain moisture. It is desired to detect and indicate the height of this material within container 10.

For measuring the height of the material, a detector is employed comprising a support channel 14 mounted in the container either by being secured to the side wall thereof or by some other suitable means, and in which channel there is mounted a collapsible rubber-like tube 16. The tube 16 is retained in the channel by straps 20 spaced along the open side of the channel.

Inside tube 16 may be a small perforated tube 26 which includes perforations 28 extending along at least the side portions thereof. Tube 26 receives air displaced in larger tube 16 when the latter is collapsed and will give up air to the tube 16 when the latter expands. The lower end of tube 16 is closed and the upper end is covered by a cap 30 through which the unperforated tube 32 extends and which is connected within the cap to the upper end of tube 26. The perforated tube 26, I have found, is not always necessary and FIGURES 3 and 4 show the action of tube 16 without tube 26 while FIGURE 5 shows the action of tube 16 with tube 26.

Further, as to the internal perforated tube, this is an escape passageway to prevent the entrapping of gas pockets along the collapsible tube beneath the surface of the material in the container. Normally, as mentioned, this tube can be eliminated without effecting the operation of the device. For free flowing materials such as dry portland cement, there would be no entrapping of gas pockets along the collapsible tube and the inner perforated tube would not be required. For sand, particularly damp sand, however, there is some tendency for the material to have a sort of "mass" action and to slide in quantities rather than to flow freely and in a case of this nature, the perforated tube is of merit in preventing the formation of entrapped gas pockets along the collapsible tube.

As will be seen in FIGURE 1, tube 32 leads to a flexible element such as bellows 34 which carries a pointer 36 movable along a graduated scale 38 as the bellows expands and contracts. Expansion and contraction of bellows 34 is accomplished by displacing air into the bellows or releasing air therefrom and this, in turn, is brought about by either collapsing or expanding tube 16. Expansion and collapsing of tube 16, in turn, is brought about by the action of material 12 on the tube as is shown in FIGURES 4 and 6. In FIGURE 6 it will be seen that the tube 16 is collapsed by the material 12 to a point close to the top surface of the material.

The tube in fully collapsed condition is shown in FIGURE 4, and it will be appreciated that collapsing of the tube will displace a substantial amount of air therefrom which will cause expansion of bellows 34.

The bellows is provided with a weight or spring means 40 which continuously biases it toward closed position. The bellows may be metal or may advantageously be formed of a plastic material so that the system becomes a substantially constant pressure system. By using a constant pressure system, the system becomes readily adaptable to substantially any conditions of size of the container and substantially uniform calibrations along scale member 38 can be employed.

While it is intended that the pneumatic system be entirely sealed off, it is the case that there may be some slight leakage of gas therefrom, and make up gas can be supplied via valve 39 if desired.

The system of the present invention is a closed system and is therefore sensitive to temperature. FIGURE 7 shows how an auxiliary bellows 50 could be connected to the system with a temperature sensitive element such as bimetal coil 52 operatively connected to the bellows by a lever 54 so that with rising temperature bellows 50 would expand and receive gas from the system and prevent movement of pointer 36. Falling temperature would cause collapsing of bellows 50 to displace gas into the system and thereby prevent movement of pointer 36.

In FIGURE 8, auxiliary bellows 60 acts via a lever 62 to change the bias on indicator bellows 64 so that change in pressure of the gas in the system due to temperature fluctuation will not cause movement of the pointer actuated by bellows 64. A spring 65 which biases bellows 64 is adjusted by movement of lever 62.

The temperature compensation could also be effected by moving the normally stationary end of the indicator bellows as in FIGURE 9 wherein indicator bellows 70 is supported by yoke 72 which is moved by temperature sensitive bellows 74 to compensate for temperature fluctuation.

The system may employ air as the gas, as described, in which case the temperature compensation is important. However, nitrogen and other gases can be used which will greatly reduce the fluctuation in the system due to temperature changes. It is intended to comprehend all suitable gases within the purview of this invention.

The collapsible tube may be reinforced, as by textile embedded therein if desired, to prevent deterioration of the tube when the material has sharp edges as, for example, some rock cases.

It will be noted that the pressure in the system is quite low with respect to the pressure developed in the material being measured so that the collapsible tube will be flattened out up to substantially the upper surface of the material in the container. The device is therefore substantially insensitive to the pressure in the container and has substantially the same sensitivity and response when the material is light as it does when the material is heavy.

The system proposed by the present invention is relatively simple and inexpensive, and is readily adaptable to various situations and is easily fitted to substantially any size tank or container.

It will be understood that this invention is susceptible to modification in order to adapt it to different usages and conditions; and accordingly, it is desired to comprehend such modifications within this inventon as may fall within the scope of the appended claims.

What is claimed is:

1. A device operating at substantially constant pressure for measuring and indicating the level of flowable granular or finely divided solid material in a container which comprises a readily collapsible fluid tight tube element adapted for being placed in the container so as to extend downwardly therein whereby to be immersed in the flowable material in the container, a fluid tight expansible element outside the container, and variable in volume with substantially no change in pressure therein, tube means connecting the said collapsible tube element to said expansible element in fluid exchange relation to form a closed fluid system, means for indicating the change in the degree of expansion of said expansible element as brought about by changes in the degree of collapsing of said collapsible tube element by changes in the level of the material in the container, and means for maintaining a substantially constant pressure in said fluid system.

2. A device according to claim 1 in which one end of said expansible element is fixed and the other end thereof is movable, and said means for indicating the change in degree of expansion of said expansible element comprising cooperating elements of a pointer and scale device on said other end of said expansible element and stationarily mounted adjacent said expansible element.

3. A device according to claim 2 in which the movable other end of said expansible element is the upper end thereof, and said means for maintaining a substantially constant pressure in said system comprises a weight mounted on the upper end of said expansible element.

4. A device according to claim 2 in which said means for maintaining a substantially constant pressure in said system comprises temperature sensitive means associated with said device and operable to compensate for changes in the volume of the fluid in said system brought about by variations in ambient temperature.

5. A device according to claim 4 in which said temperature sensitive means is in the form of a member which expands and contracts in response to temperature changes, said member being operatively connected to one of the elements of said pointer and scale device to change the relation between said elements in a manner to compensate for the change in relation between said elements brought about by change in temperature of the fluid in said system.

6. A device according to claim 4 in which said temperature sensitive means is in the form of a member which expands and contracts in response to temperature changes, an expansible member in fluid communication with the fluid in said system, and means connecting said temperature sensitive member with said expansible member so as to cause the latter to expand as the ambient temperature increases and to contract as the ambient temperature decreases.

7. A device according to claim 4 in which said temperature sensitive means is in the form of a member which expands and contracts in response to temperature changes, and means operatively connecting said temperature sensitive member with said expansible element to exert a thrust on said element in conformity with changes in temperature.

8. A device according to claim 7 in which said collapsible tube element is flexible, and a rigid support on which the tube element is carried and adapted for being positioned in said container.

9. A device according to claim 8 in which said tube element is rubber like and said support is in the form of a channel member in which the tube element is disposed, the tube element being exposed to the material in the container via the open side of said channel member.

10. A device according to claim 4 in which said temperature sensitive means is in the form of a member which expands and contracts in response to temperature changes, said member having one end fixed and the other end free to move, and a bracket connecting the other end of said member to the said one end of said expansible element for bodily moving said expansible element in response to changes in temperature.

References Cited by the Examiner

UNITED STATES PATENTS

| 1,641,454 | 9/1927 | Paty | 73—393 |
|---|---|---|---|
| 1,661,995 | 3/1928 | Brown | 73—299 |
| 2,366,566 | 1/1945 | Shivers. | |
| 2,382,695 | 8/1945 | De Giers | 75—299 |
| 2,713,793 | 7/1955 | Andersen | 73—301 |

FOREIGN PATENTS

| 596,164 | 7/1959 | Italy. |
|---|---|---|
| 360,512 | 4/1962 | Switzerland. |

LOUIS R. PRINCE, *Primary Examiner.*

FRANK H. THOMSON, *Assistant Examiner.*